(12) United States Patent
Wala

(10) Patent No.: US 7,848,747 B2
(45) Date of Patent: *Dec. 7, 2010

(54) SYSTEM AND METHOD FOR ENHANCING THE PERFORMANCE OF WIDEBAND DIGITAL RF TRANSPORT SYSTEMS

(75) Inventor: Philip M. Wala, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/606,755

(22) Filed: Oct. 27, 2009

(65) Prior Publication Data

US 2010/0046641 A1 Feb. 25, 2010

Related U.S. Application Data

(63) Continuation of application No. 11/398,879, filed on Apr. 6, 2006, now Pat. No. 7,610,046.

(51) Int. Cl.
*H04W 4/00* (2009.01)

(52) U.S. Cl. .................. 455/424; 455/450; 455/509; 370/347; 375/257

(58) Field of Classification Search .......... 455/424, 455/560–562.1, 131, 323, 334, 502, 450–453, 455/509; 370/395.21, 468, 310, 347, 350, 370/304, 320, 329; 375/257, 240, 316; 398/334, 398/58, 69, 115; 341/101–255
See application file for complete search history.

(56) References Cited

U.S. PATENT DOCUMENTS

| 4,183,054 A | 1/1980 | Patisaul et al. |
| 4,611,323 A | 9/1986 | Hessenmiiller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |

(Continued)

FOREIGN PATENT DOCUMENTS

EP 0391597 3/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner*—Kamran Afshar
(74) *Attorney, Agent, or Firm*—Fogg & Powers LLC

(57) ABSTRACT

A system and method for enhancing the performance of wideband digital RF transport systems is disclosed, which enables the transport of different bandwidth segments on a plurality of wideband channels by selecting an optimal clock sample rate for each bandwidth segment to be transported. Thus, the bandwidth segments are proportionally allocated so that an optimum amount of bandwidth can be transported at the serial bit rate.

17 Claims, 2 Drawing Sheets

U.S. PATENT DOCUMENTS

| | | |
|---|---|---|
| 5,321,849 A | 6/1994 | Lemson |
| 5,339,184 A | 8/1994 | Tang |
| 5,572,517 A | 11/1996 | Safadi |
| 5,627,879 A | 5/1997 | Russell et al. |
| 5,818,883 A | 10/1998 | Smith et al. |
| 5,898,693 A | 4/1999 | Vecchi et al. |
| 6,456,602 B1 * | 9/2002 | Hwang et al. ............... 370/307 |
| 6,728,763 B1 | 4/2004 | Chen |
| 7,050,419 B2 | 5/2006 | Azenkot et al. |
| 7,068,679 B1 | 6/2006 | Brown et al. |
| 7,209,455 B2 | 4/2007 | Yee et al. |
| 7,417,946 B2 | 8/2008 | Kim et al. |
| 7,610,046 B2 * | 10/2009 | Wala ........................... 455/424 |
| 7,642,939 B2 * | 1/2010 | Nanevicz ..................... 341/101 |
| 2002/0163937 A1 | 11/2002 | Svacek et al. |
| 2003/0026298 A1 | 2/2003 | Bisson et al. |
| 2004/0074025 A1 | 4/2004 | Blaustein et al. |
| 2004/0101303 A1 | 5/2004 | Williams |
| 2004/0132474 A1 | 7/2004 | Wala |
| 2004/0177153 A1 | 9/2004 | Pelley |
| 2005/0010958 A1 | 1/2005 | Rakib et al. |
| 2005/0114903 A1 * | 5/2005 | Ahmed et al. ................ 725/114 |
| 2006/0121944 A1 | 6/2006 | Buscaglia et al. |
| 2007/0071033 A1 | 3/2007 | Surek et al. |
| 2008/0056192 A1 | 3/2008 | Strong et al. |
| 2008/0240225 A1 * | 10/2008 | Zavadsky et al. ............. 375/240 |

FOREIGN PATENT DOCUMENTS

| | | |
|---|---|---|
| EP | 0687084 | 12/1995 |
| WO | 9115927 | 10/1991 |
| WO | 0233969 | 4/2002 |
| WO | 2004070582 | 8/2004 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

SYSTEM AND METHOD FOR ENHANCING THE PERFORMANCE OF WIDEBAND DIGITAL RF TRANSPORT SYSTEMS

CROSS REFERENCES TO RELATED APPLICATIONS

This application is a continuation of application Ser. No. 11/398,879 filed on Apr. 6, 2006, entitled "SYSTEM AND METHOD FOR ENHANCING THE PERFORMANCE OF WIDEBAND DIGITAL RF TRANSPORT SYSTEMS" (currently pending) which is hereby incorporated herein by reference.

FIELD OF THE INVENTION

The present invention relates generally to the telecommunications field, and more specifically, but not exclusively, to a system and method for enhancing the performance of wideband digital Radio Frequency (RF) transport systems.

BACKGROUND OF THE INVENTION

In wireless voice and data communications, the digital transport of RF signals over long distances via fiber optic cables provides enhanced capacity, and higher performance distributed coverage than existing analog RF transport systems currently being used. An example of such a digital RF transport system that links a digital host unit to one or more digital remote units to perform bi-directional simultaneous digital RF distribution is disclosed in U.S. Patent Application Publication No. 2004/0132474 A1, entitled "POINT-TO-MULTIPOINT DIGITAL RADIO FREQUENCY TRANSPORT", which is assigned to ADC Telecommunications, Inc. of Eden Prairie, Minn. and incorporated herein in its entirety.

Notwithstanding the advantages of today's digital RF transport systems over other types of RF transport systems, a significant problem exists in the transport of large amounts of digital RF bandwidth (e.g., wideband). For example, the existing wideband digital RF transport systems combine multiple digitized signals and convey them in serialized form on a common physical layer between the transmit and receive devices involved. However, the problem with the existing digital RF transport systems is that they inefficiently transport equal amounts of bandwidth for different wideband channels. In other words, the serial bit streams on the transport layer that convey N wideband channels are all tied to one sample rate, and the system transport spectrum (RF) is sent point-to-point in equal bandwidth segments (e.g., 25 MHz blocks). Consequently, since many of the wideband channels have bandwidth requirements that are less (or different) than 25 MHz (e.g., 5 MHz, 10 MHz, 30 MHz, etc.), the overall bandwidths of existing wideband digital RF transport systems are substantially underutilized. Therefore, a pressing need exists for a system and method that can enhance the performance of wideband digital RF transport systems, by maximizing the utilization of the transport bandwidth, custom tailoring the bandwidth allocations to specific user needs on a common platform, and enabling the use of lower cost transport system devices. As described in detail below, the present invention provides such a system and method, which resolves the above-described bandwidth underutilization problems and other related problems.

SUMMARY OF THE INVENTION

The present invention provides a system and method for enhancing the performance of wideband digital RF transport systems, which enables the transport of different bandwidth segments on a plurality of wideband channels by selecting an optimal clock sample rate for each bandwidth segment to be transported. Thus, the present invention allocates the bandwidth segments proportionally so that an optimum amount of bandwidth can be transported at the serial bit rate. In accordance with a preferred embodiment of the present invention, a system for enhancing the performance of a wideband digital RF transport system is provided, which includes a transmit unit, a receive unit, and an optical transmission medium connected between the transmit unit and the receive unit. The transmit unit includes a plurality of wideband RF analog signal inputs coupled to a plurality of analog-to-digital, digital down-converter (A/D DDC) devices. Notably, the sample rate of each A/D DDC device is determined by a respective sample clock. The digitized wideband RF signal segments at the outputs of the A/D DDC devices are combined and converted to a frame structure, converted to serial form, and transmitted on the optical transmission medium to the receive unit. A light detection device in the receive unit detects the serial bit stream of frames on the optical transmission medium, the serialized frames are converted back to the original frame format, and the original digitized wideband RF segments are reconstructed. Each digitized wideband RF segment is coupled to a respective D/A digital up-converter (D/A DUC) device associated with a particular wideband RF signal input on the transmit side. Notably, the output sample rate of each D/A DUC device is determined by a respective sample clock, which provides the same sample rate as that of the associated A/D DDC device in the transmit unit. The sample rate of each A/D DDC device (and associated D/A DUC device) is pre-selected so that the transmission medium can transport the optimum amount of RF bandwidth at the given serial bit rate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawing(s), wherein:

DETAILED DESCRIPTION OF PREFERRED EMBODIMENT

Figure 1:
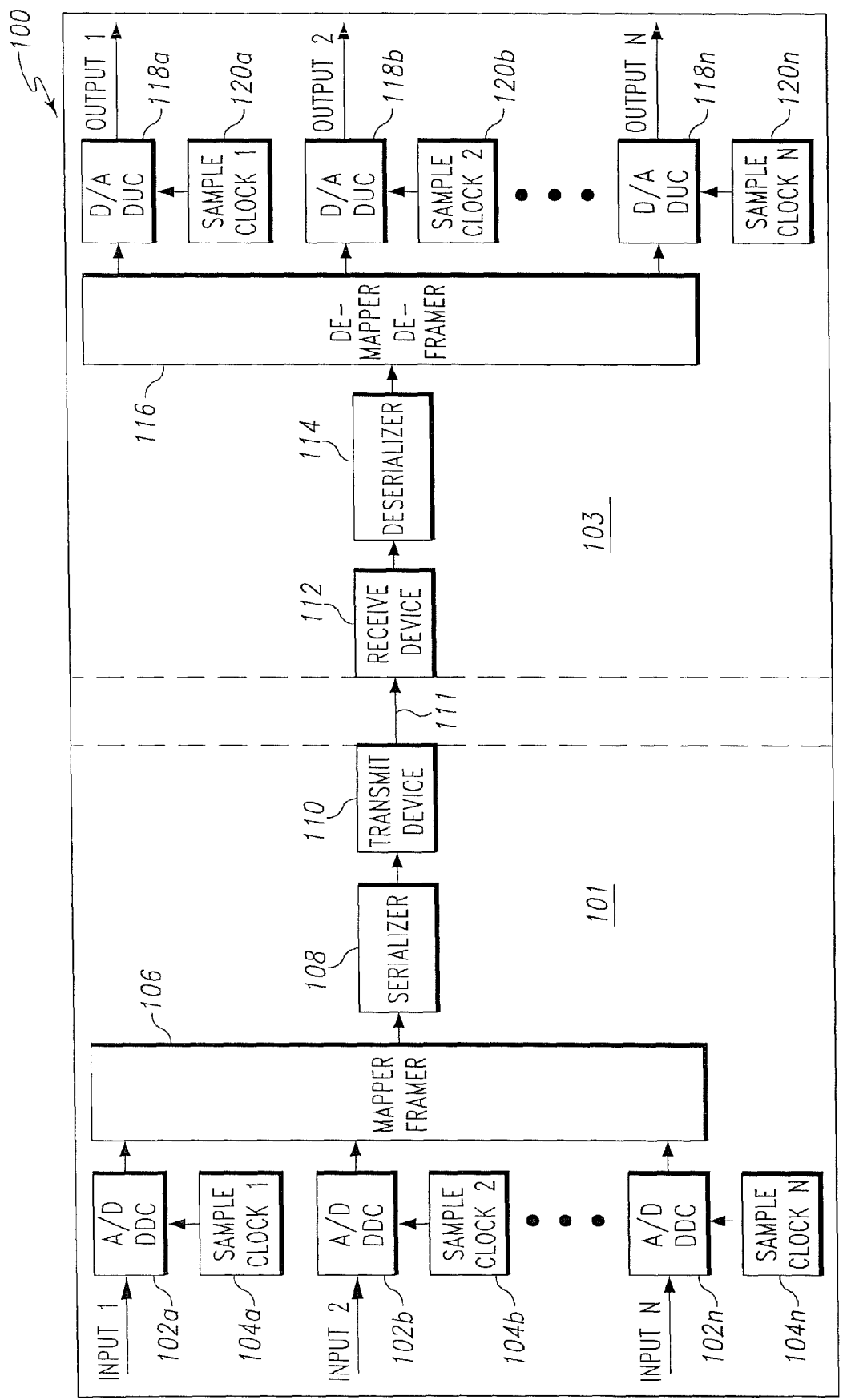
FIG. 1 depicts a schematic block diagram of an example system for enhancing the performance of wideband digital RF transport systems, which can be used to implement a preferred embodiment of the present invention.

With reference now to the figures, FIG. 1 depicts a schematic block diagram of an example system 100 for enhancing the performance of wideband digital RF transport systems, which can be used to implement a preferred embodiment of the present invention. System 100 includes a first communications unit 101, a second communications unit 103, and a transmission (transport) medium 111 connected between first communications unit 101 and second communications unit 103. For this example embodiment, first communications unit 101 is a wideband digital RF transmit unit, second communications unit 103 is a wideband digital RF receive unit, and transmission medium 111 is a single mode (or multi-mode)

fiber optic cable. Although system 100 is depicted for illustrative purposes as a unidirectional communications system, the scope of coverage of the present invention is not intended to be so limited, and system 100 could also be implemented as a bi-directional communications system (e.g., using a transceiver on each side). Also, for this illustrative example, system 100 may be implemented as a point-to-point digital RF transport system for cellular radiotelephone voice and data communications, with a digital host unit (first communications unit 101) that provides an interface between a plurality of base station RF ports and the fiber optic cable, and a digital remote unit (second communications unit 103) that provides an interface between the fiber optic cable and a remote antenna. Additionally, although the transmission medium 111 is described as an optical transmission medium for this illustrative embodiment, the present invention is not intended to be so limited and can include within its scope any suitable transmission medium (e.g., millimeter wave radio link, microwave radio link, satellite radio link, infrared wireless link, coaxial cable, etc.) capable of transporting a serial bit stream.

For this example embodiment, first communications unit 101 includes a plurality of input interfaces 102a-102n. Each input interface 102a-102n is implemented with an A/D DDC device, for this illustrative embodiment. An input of each A/D DDC device 102a-102n couples a respective analog frequency band (or channel) into the associated A/D DDC device. For example, each A/D DDC device 102a-102n can accept an input analog frequency band (e.g., frequency band from a base transceiver station) at a relatively high rate, and digitizes and down-converts the respective frequency band to suitable digital real and complex (e.g., I/Q) baseband signals. For example, the output from each A/D converter section of an A/D DDC device 102a-102n can be a sequence of real samples, representing a real (positive frequency) signal within a designated Nyquist zone. The output from each DDC section can be a baseband signal (centered at zero Hz) with positive and negative frequencies, composed of two sample streams (real and imaginary components) with each stream at one half the sample rate of the equivalent real-valued signal.

Notably, in the example embodiment depicted in FIG. 1, the input interfaces 102a-102n to communications unit 101 are implemented with a plurality of A/D DDC devices that can accept a plurality of analog RF bandwidths, but the present invention is not intended to be so limited. In other embodiments, the input interfaces can be implemented with other types of input devices to accept other types of bandwidths. For example, in order to accept a plurality of RF inputs, each input interface device 102a-102n can be implemented with a single A/D converter (no DDC) operating at IF (e.g., real digital output), dual A/D converters (no DDC) operating at baseband (e.g., complex I/Q digital output), or single or dual A/D converters operating at a high sample rate and followed by digital down-conversion (DDC) whereby the output is a lower sample rate representation (complex I/Q) of a portion of the original band. In another embodiment, each input interface device 102a-102n can be implemented by a direct digital input (typically baseband I/Q) from a digital or "software-defined" base station. In sum, the plurality of input interfaces 102a-102n can be implemented with any suitable input interface device(s) capable of accepting or inputting analog or digital wideband segments.

For this example embodiment, each A/D DDC device 102a-102n can be implemented as part of a modular (e.g., pluggable) RF card capable of adjustable bandwidth selection that can be determined by user requirements. For example, in one embodiment, each A/D DDC device 102a-102n can be implemented as part of an RF card that passes 5 MHz bandwidth segments. Notably, the sample rate of each A/D DDC device 102a-102n is determined by an associated sample clock 104a-104n. Therefore, by selecting a suitable sample rate for each A/D DDC device 102a-102n, the present invention provides the ability to custom tailor the bandwidth allocations to specific user needs on the common transport platform being used.

For example, one or more users may desire to transport a combination of one 5 MHz segment and three 15 MHz segments from a digital host unit (e.g., first communications unit 101) to a digital remote unit (e.g., second communications unit 103) via a fiber optic cable (e.g., transmission medium 111). For a given serial bit rate on the fiber optic cable, a suitable sample rate may be selected for the sample clock 104a-104n associated with each A/D DDC device 102a-102n to be used. For this example, assume that the 5 MHz segment is to be input to A/D DDC device 102a, and each of A/D DDC devices 102b, 102c and 102d (where "n" in this case is equal to 4) is designed to accept a respective one of the three 15 MHz segments to be transported. The sample rate for sample clock 104a is selected to accommodate the transport of the 5 MHz segment (band) at the given serial bit rate, and the sample rates for sample clocks 104b-104d are selected to accommodate the transport of the respective 15 MHz segments at the given serial bit rate. In a practical application, the sample rates (e.g., approximately 45 Msps) of sample clocks 104b-104d are typically three times the sample rate of sample clock 104a (e.g., approximately 15 Msps) for a given serial bit rate on a fiber optic cable. In any event it should be readily understood that the present invention is not intended to be limited to a particular set of clock sample rates, the size of a frequency band that can be accepted by a specific A/D DDC device, the size of the frequency bands to be transported, or the serial bit rate for the optical transmission medium to be used.

For example, a suitable clock sample rate can be selected to accommodate the transport of a 75 MHz segment (e.g., at 15 times the clock sample rate used for a 5 MHz segment) from the input of a particular A/D DDC device via a fiber optic cable at a specific serial bit rate. As another example, assume that each A/D DDC device 102a-102n is designed to process a 10 MHz band of frequencies. In this case, a suitable sample rate for each sample clock can be selected to accommodate the transport of a 10 MHz band and/or a band that is a multiple of 10 MHz (e.g., 30 MHz band at three times the sample rate of the sample rate used for the 10 MHz band). In other words, the present invention enables a user to transport just the required amount of bandwidth at the serial bit rate of the transmission medium to be used.

For this example embodiment, the digitized output of each A/D DDC device 102a-102n is coupled to a mapper/framer device 106. Essentially, the mapper section of mapper/framer device 106 multiplexes together the digitized bands at the outputs of the plurality of A/D DDC devices 102a-102n, and the framer section of mapper/framer device 106 converts the multiplexed digitized bands into a suitable frame structure format. For example, in a practical application, the mapper/framer device 106 can construct a suitable frame structure that provides up to twelve (e.g., 5 MHz) slots per frame. However, it should be understood that the present invention is not intended to be limited to a specific number of slots per frame, and any suitable number of slots per frame may be used. In any event, the frame(s) containing the multiplexed band segments are coupled from mapper/framer device 106 to a serializer device 108, which converts the parallel frame data from the mapper/framer device 106 to a serial bit stream. The serial data from serializer device 108 is coupled to an optical transmit device 110. The optical transmit device 110 processes and translates that data into coded light pulses that form a serial bit stream. An injection-laser diode or other suitable light source generates the light pulses, which are funneled with suitable optical lenses into the optical transmission medium (e.g., fiber optic cable) 111. For example, optical transmission medium 111 can be a single mode or multi-mode fiber optic cable. Notably, an optical transport medium is used for this illustrative embodiment, but the present invention is not intended to be so limited and can include within its scope of coverage any suitable transport medium that can convey a serial bit stream.

For this example embodiment, second communications unit 103 includes a receive device 112, which includes a light sensitive device that detects the pulsed light signals (e.g., serial bit stream of frames) on transmission medium 111, converts the light signals to digital signals, and conveys them in serial form to a deserializer device 114. Again, it should be understood that although a light sensitive device is used for this illustrative embodiment, the present invention is not intended to be so limited and can include within its scope of coverage any suitable device that can receive and/or detect a serial bit stream from the particular transport medium being used. Deserializer device 114 converts the serial frame data from receive device 112 to parallel frame data, which is coupled to a demapper/deframer device 116. Essentially, demapper/deframer device 116 demultiplexes the parallel frame data, and extracts the bandwidth segments from the demultiplexed frames. The extracted bandwidth segments are coupled to the inputs of the appropriate output interfaces 118a-118n. For this illustrative embodiment, each output interface 118a-118n is implemented with a digital-to-analog (D/A) digital up-converter (D/A DUC) device. Each D/A DUC device 118a-118n converts the complex digital baseband signal to a real passband signal. For example, each digital baseband signal can be filtered, converted to the appropriate sampling rate by a respective sample clock 120a-120n, upconverted to an appropriate frequency, and modulated onto an analog signal. For this example embodiment, the sample rate of each sample clock 120a-120n is selected to be the same as the sample rate of the corresponding sample clock 104a-104n in first communications unit 101. Thus, the analog bandwidth segments input to first communications unit 101 are transported via optical transmission medium 111 as a serial bit stream, and reconstructed at the corresponding output in second communications unit 103.

Notably, in the example embodiment depicted in FIG. 1, the output interfaces 102a-102n of communications unit 103 are implemented with a plurality of D/A DUC devices that can output a plurality of analog RF bandwidths, but the present invention is not intended to be so limited. In other embodiments, the output interfaces can be implemented with other types of output devices for other types of bandwidths. For example, in a second embodiment, in order to process a real digital signal at its input, each output interface 118a-118n can be implemented with a single D/A converter and analog up-conversion. In another embodiment, in order to process a complex digital signal at its input, each output interface 118a-118n can be implemented with dual D/A converters and analog up-conversion, or a DUC (e.g., digital up-conversion) and dual D/A converters. In sum, the plurality of output interfaces 118a-118n can be implemented with any suitable output interface device(s) capable of outputting analog or digital wideband segments.

Figure 2:
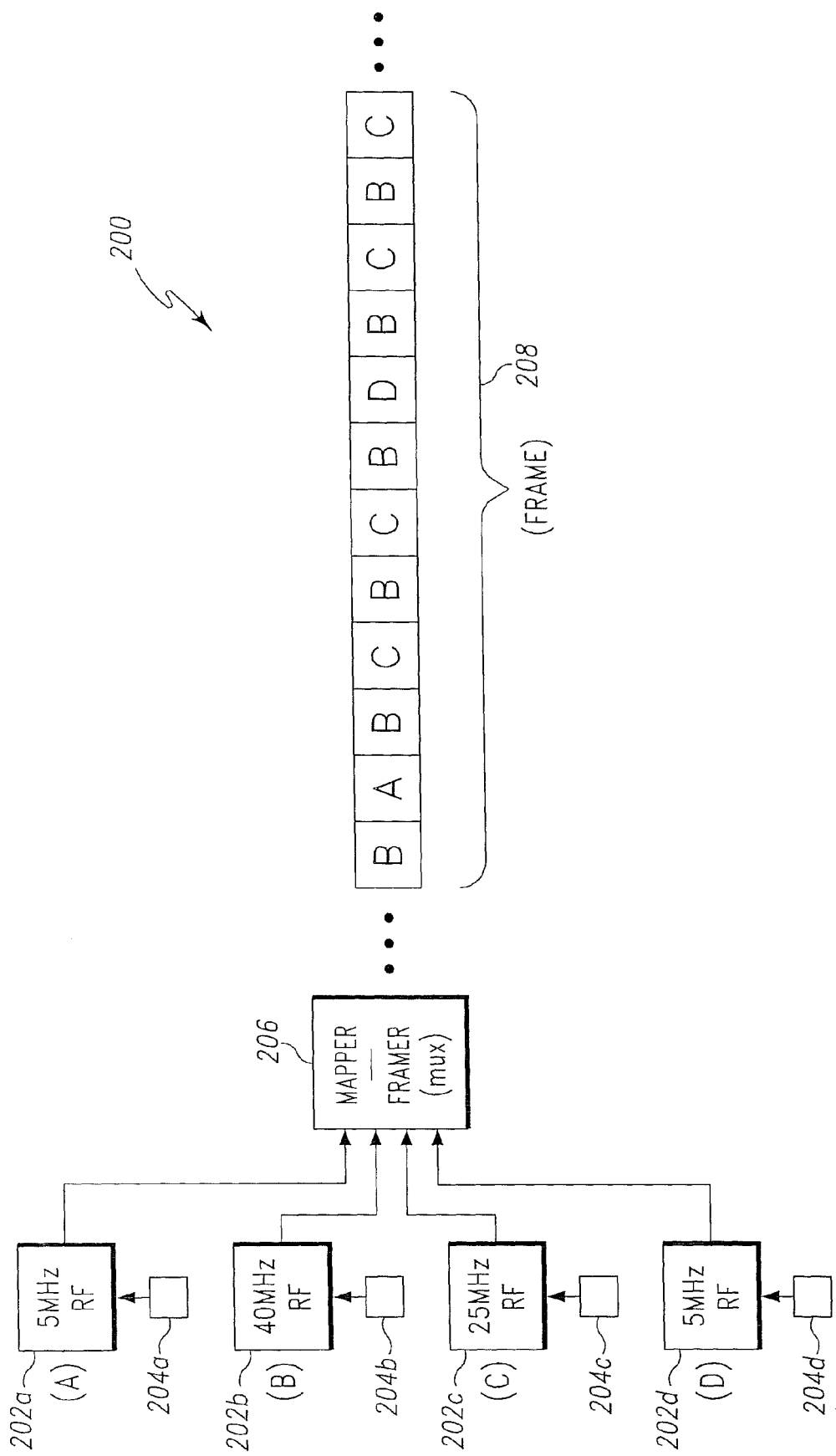
FIG. 2 depicts a pictorial representation of an example frame structure, which illustrates key principles of the present invention.

FIG. 2 depicts a pictorial representation of an example frame structure 200, which illustrates key principles of the present invention. Essentially, the frame structure 200 shown in FIG. 2 illustrates how the present invention allocates bandwidth proportionally, which allows a user to maximize the amount of bandwidth that can be transported on the serial bit stream. As such, the present invention enables users to transport different bandwidths efficiently on a plurality of wideband channels, instead of having to transport equal amounts of bandwidth inefficiently on those channels.

Specifically, referring to this illustrative example, it may be assumed that four different bandwidths are to be transported by system 100 depicted in FIG. 1. As such, for this example, bandwidth A (5 MHz RF) is input to A/D DDC device 202a, bandwidth B (40 MHz RF) is input to A/D DDC device 202b, bandwidth C (25 MHz RF) is input to A/D DDC device 202c, and bandwidth D (5 MHz RF) is input to A/D DDC device 202d. A respective sample clock 204a-204d inputs a unique sample rate to the associated A/D DDC device 202a-202d. The outputs from A/D devices 202a-202d are coupled to a mapper/framer device 206 and a serializer device (not shown), which multiplexes or combines the separate bandwidth segments (A, B, C, D) and constructs a suitable frame 208 including the bandwidth segments for transport. For this example frame structure, assume that the frame rate is approximately 15 MHz, and each of the frame's 12 slots includes 16 bits of digitized RF (with 14 bits of payload). The sample rate of sample clock 204a is selected to be approximately 15 Msps (for 5 MHz bandwidth segments), approximately 90 Msps for sample clock 204b (for 40 MHz bandwidth segments), approximately 60 Msps for sample clock 204c (for 25 MHz bandwidth segments), and approximately 15 Msps for sample clock 204d (for 5 MHz bandwidth segments). Thus, as illustrated by this example, the bandwidths in frame 208 are allocated proportionally, by transporting one slot for bandwidth A (5 MHz), six slots for bandwidth B (40 MHz), four slots for bandwidth C (25 MHz), and one slot for bandwidth D (5 MHz).

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method, comprising:
   receiving a plurality of analog inputs each having an associated bandwidth containing an arbitrary number of channels;
   sampling each of the plurality of analog inputs with a selected sample rate, the selected sample rates selected based on the bandwidth of the associated one of the plurality of analog inputs;
   combining the samples of the plurality of analog inputs;
   converting the combined samples to a serial data stream; and
   transmitting the serial data stream over a communication medium.

2. The method of claim 1, wherein receiving a plurality of analog inputs comprises receiving a plurality of analog RF bands from a plurality of base stations, each band including a number of channels.

3. The method of claim 1, wherein sampling each of the plurality of analog inputs comprises:

converting the analog input to digital samples; and
down-converting the digital samples.

4. The method of claim 1, wherein combining the samples comprises combining the samples into slots of a frame.

5. The method of claim 1, and further comprising:
receiving the serial data stream over the communication medium;
deserializing the serial data stream to parallel data;
demultiplexing the parallel data; and
converting the parallel data to reproduce the plurality of analog inputs.

6. The method of claim 1, wherein the sample rate is proportional to the bandwidth of the associated one of the plurality of analog inputs.

7. A host unit for wideband digital RF transport, the unit comprising:
a plurality of inputs, each input coupled to receive a broadband RF signal;
a plurality of analog to digital converter circuits, each coupled to a selected one of the plurality of inputs, each analog to digital converter circuit generating a sample stream, wherein each analog to digital converter circuit operating at a sample rate related to a signal bandwidth of its associated broadband RF signal; and
a multiplexer circuit for multiplexing together the plurality of sample streams into one serial bit stream at a fixed bit rate.

8. The host unit of claim 7, wherein each of the plurality of analog to digital converter circuits comprises one of (1) a single analog to digital converter operating at IF, (2) a dual analog to digital converter circuit operating at baseband, and (3) an analog to digital converter operating at a high sample rate followed by a digital down converter.

9. The host unit of claim 7, wherein each of the plurality of analog to digital converter circuits comprises a pluggable RF card that is programmable to pass broadband RF bandwidth in multiples of a selected unit bandwidth based on the selected sample rate.

10. The host unit of claim 7, wherein the multiplexer circuit comprises:
a mapper that multiplexes together the plurality of sample streams;
a framer, coupled to the mapper, the framer converts the multiplexed sample streams into slots of a frame; and
a serializer which converts the frame into the serial bit stream at the fixed bit rate.

11. A host unit for wideband digital RF transport, the unit comprising:
a plurality of inputs, each input coupled to receive one of a direct digital input of an RF bandwidth and a broadband, analog RF bandwidth;
wherein each of the plurality of inputs that receives a broadband, analog RF bandwidth includes an analog to digital converter circuit that samples the associated broadband analog RF bandwidth with a selected sample rate, the selected sample rates selected based on the bandwidth of the analog signal;
a mapper/framer device, an output of each input coupled to an input of said mapper/framer device, the mapper/framer device multiplexes together the direct digital inputs and the sampled, broadband analog RF bandwidths into a frame structure; and
a serializer that serializes the output of the mapper/framer into one serial bit stream at a fixed bit rate.

12. The host unit of claim 11, wherein the analog to digital converter circuit converts the analog signal to a digital signal and down-converts the digital signal.

13. The host unit of claim 11, wherein the analog to digital converter circuit comprises one of (1) a single analog to digital converter operating at IF, (2) a dual analog to digital converter circuit operating at baseband, and (3) an analog to digital converter operating at a high sample rate followed by a digital down converter.

14. A wideband digital RF transport system comprising:
a host unit coupled to a remote unit over a transmission medium;
the host unit including
a plurality of inputs that receive a plurality of RF bandwidth segments, each segment having an arbitrary number of channels, each input configured to receive either a direct digital input of an RF bandwidth segment or an analog RF bandwidth segment;
a mapper/framer device, an output of each input coupled to an input of said mapper/framer device, the mapper/framer device multiplexes together the RF bandwidth segments, in digital form, from each input into a frame structure; and
a serializer that serializes the output of the mapper/framer into one serial bit stream at a fixed bit rate; and
a transmit device coupled to the transmission medium to transmit the serial bit stream over the transmission medium; and
the remote unit including:
a receive device that receives the serial bit stream over the transmission medium;
a deserializer, coupled to the receive device, the deserializer converting the serial data stream into parallel frame data;
a de-mapper/de-framer, coupled to the deserializer, that extracts RF bandwidth segments from the frame data; and
a plurality of outputs that receive the extracted RF bandwidth segments, in digital form, and convert the RF bandwidth segments to an analog RF bandwidth segment, wherein each output has an associated sample clock with a sample rate selected based on the bandwidth of the associated RF bandwidth segment.

15. The system of claim 14, wherein each of the plurality of inputs that receives an analog RF bandwidth segment includes an analog to digital converter circuit converts the analog RF bandwidth segment to a digital signal and down-converts the digital signal.

16. The system of claim 15, wherein each analog to digital converter circuit has an associated sample clock with a sample rate selected based on the bandwidth of the associated RF bandwidth segment.

17. The system of claim 14, wherein the transmission medium is one of an optical fiber, millimeter wave radio link, microwave radio link, satellite radio link, infrared wireless link, and a coaxial cable.

* * * * *